United States Patent
Spitz

(10) Patent No.: US 8,386,913 B2
(45) Date of Patent: Feb. 26, 2013

(54) PORTABLE DATA CARRIER AS A WEB SERVER

(75) Inventor: Stephan Spitz, München (DE)

(73) Assignee: Giesecke & Devrient GmbH, Munich (DE)

( * ) Notice: Subject to any disclaimer, the term of this patent is extended or adjusted under 35 U.S.C. 154(b) by 454 days.

(21) Appl. No.: 12/531,762

(22) PCT Filed: Mar. 20, 2008

(86) PCT No.: PCT/EP2008/002274
§ 371 (c)(1),
(2), (4) Date: Sep. 17, 2009

(87) PCT Pub. No.: WO2008/113599
PCT Pub. Date: Sep. 25, 2008

(65) Prior Publication Data
US 2010/0050066 A1 Feb. 25, 2010

(30) Foreign Application Priority Data
Mar. 20, 2007 (DE) .......................... 10 2007 013 339

(51) Int. Cl.
*G06F 17/00* (2006.01)
*G06F 15/16* (2006.01)

(52) U.S. Cl. ........ 715/205; 715/201; 715/234; 715/741; 709/203; 709/227

(58) Field of Classification Search .......... 715/200–208, 715/210, 231, 232, 234, 273, 760, 212, 216, 715/217, 219, 220, 221, 223, 224, 225; 709/201, 709/202, 203, 204, 205, 206, 207, 212, 216, 709/217, 219, 220, 221, 223, 224, 225
See application file for complete search history.

(56) References Cited

U.S. PATENT DOCUMENTS

| | | | |
|---|---|---|---|
| 6,941,306 B2* | 9/2005 | Kim | 1/1 |
| 7,249,100 B2* | 7/2007 | Murto et al. | 705/50 |
| 7,533,257 B2* | 5/2009 | Lee et al. | 713/155 |

(Continued)

FOREIGN PATENT DOCUMENTS

| | | |
|---|---|---|
| EP | 1739603 A1 | 1/2007 |
| WO | 03094474 A1 | 11/2003 |
| WO | 2005091107 A1 | 9/2005 |

OTHER PUBLICATIONS

Malandrino at al., "Tackling Web dynamics by programmable proxies", Computer Networks, Elsevier Science Publishers B.V., Amsterdam, NL, Bd. 50, Nr.10, Jul. 14, 2006, Seiten 1564-1580, XP005429507, ISSN: 1389-1286 Zusammenfassung, Absatz [2.2.4], Absatz [3.3.2].

(Continued)

*Primary Examiner* — Maikhanh Nguyen
(74) *Attorney, Agent, or Firm* — Bacon & Thomas, PLLC

(57) ABSTRACT

The invention relates to a method for providing hypertext data through a hypertext server (43) on a portable data carrier (10) for a terminal (80) connected to the portable data carrier (10), and to an accordingly adapted portable data carrier (10). The hypertext server (43) receives (100) a hypertext query of the terminal (80) and thereupon provides (200) hypertext data relating to the hypertext query. The hypertext server (43) then sends (400) the provided hypertext data as a hypertext response to the terminal (80). The method is characterized in that upon the providing (200) of the hypertext data at least one hyperlink contained in the hypertext data is checked and the checked hyperlink is contained in the hypertext response.

20 Claims, 2 Drawing Sheets

U.S. PATENT DOCUMENTS

| | | |
|---|---|---|
| 2002/0138549 A1 | 9/2002 | Urien |
| 2003/0110167 A1* | 6/2003 | Kim .................................. 707/4 |
| 2006/0161973 A1* | 7/2006 | Royer et al. ...................... 726/8 |
| 2006/0271483 A1* | 11/2006 | Ernst et al. ...................... 705/51 |
| 2008/0022374 A1* | 1/2008 | Brown et al. ..................... 726/5 |

OTHER PUBLICATIONS

Disclosed Anonymously: "Displaying broken URLs with indicators in web browsers", Research Disclosure, Mason Publications, Hampshire, GB, Bd. 504, Nr. 33, Apr. 1, 2006, XP007136090, ISSN: 0374-4353, das ganze Dokument.

Urien P.: "Internet card, a smart card as a true Internet node", Computer Communications, Elsevier Science Publishers BV, Amsterdam, NL, Bd. 23, Nr. 17, Nov. 1, 2000, Seiten 1655-1666, XP004238469, ISSN: 0140-3664, Zusammenfassung, Absatz [0006]—Absatz [0008].

International Search Report in International Patent Application No. PCT/EP2008/002274, Nov. 10, 2008.

\* cited by examiner

PORTABLE DATA CARRIER AS A WEB SERVER

FIELD OF THE INVENTION

This invention relates to a method for providing data through a server on a portable data carrier for a terminal connected to the portable data carrier, and to such a portable data carrier.

It is known that portable data carriers, in particular chip cards such as (U)SIM mobile communication cards or Internet chip cards, can serve as web servers. Accordingly adapted data carriers have a web server application and are used for example as an authentication proxy in order to establish secure Internet connections between a user and an Internet portal, for example for an online bank. The data carrier is located here as a proxy between a client, for example a browser on a terminal of the user, and an external server, for example a server of the online bank on the Internet. The proxy behaves as a server vis-à-vis the client, but as a client vis-à-vis the external server. Since there are securely stored on the data carrier an integrity-checked hyperlink to the Internet portal and confidential login data of the user, a secure sign-on of the user to the online portal via the data carrier is guaranteed.

BACKGROUND

In general, when a data carrier with a web server is used in such or a similar way, the total data traffic during an existing communication link between a terminal of a user and an external server takes place via the data carrier. In the case of large amounts of data to be transferred, for example for graphical elements, this occasionally leads to problems with regard to the memory capacity of the portable data carrier and the attainable data transfer rate of data transmission from the web server via the portable data carrier to the terminal.

WO 2005/091107 A1 discloses a browser plug-in for a web browser which makes it possible to check URLs (Uniform Resource Locators) of web resources, such as web pages or web services, for security risks potentially emanating from the resources. For this purpose, the plug-in compares a URL transmitted by the browser, before the URL is resolved and the corresponding web resource loaded, with URLs in a list of putatively security-critical URLs (a so-called "blacklist") and outputs a security warning if the transmitted URL is to be found in the list and thus to be considered a potential security risk. The list can be internally stored or be queried interactively by the plug-in via a database.

SUMMARY

It is therefore the object of the present invention to propose a method for effectively providing data through a server on a portable data carrier for a terminal connected to the data carrier.

This object is achieved by a method and a portable data carrier having the features of the coordinated claims. Advantageous embodiments and developments are stated in the claims dependent thereon.

First, in the inventive method for providing hypertext data through a hypertext server on a portable data carrier for a terminal connected to the portable data carrier, the hypertext server receives a hypertext query from the terminal. Thereupon the hypertext server provides hypertext data relating to the hypertext query. The hypertext server finally sends the provided hypertext data as a hypertext response to the terminal. Upon the providing of the hypertext data at least one hyperlink contained in the hypertext data is checked. The checked hyperlink is contained in the hypertext response sent to the terminal.

In this manner it is obtained that hypertext data and the hyperlinks contained therein which are sent by the hypertext server to the terminal can be checked by the hypertext server on the portable data carrier in order to subsequently send the hyperlinks together with the hypertext data to the terminal in checked form. An effective and secure providing of hypertext data through the hypertext server on the portable data carrier for a terminal connected to the portable data carrier is thus guaranteed.

In particular security-critical hypertext data requested by the terminal can be provided and checked by the hypertext server in this manner, so that the hypertext server acts as the central security instance vis-à-vis the terminal by providing necessary security mechanisms and security functions in a sufficiently secured manner.

A check of a hyperlink here can comprise both a check of the availability of the hypertext data to which the hyperlink points, and a hereinafter described integrity check of the background server on which the hypertext data are present to which the hyperlink points.

Within the scope of the present invention, hypertext data are understood to be data and services that are present at one or more places, being stored electronically, magnetically, optically or in a different manner, and can be retrieved and/or called up, whereby individual subunits of the data or services can be linked with each other by pointers to each other, so-called hyperlinks. Hypertext data are thus not limited to data or services that are transferable by means of the HTTP communication protocol; the latter are instead a subset of the hypertext data for the purposes of the invention. The term "hypertext" is thus to be understood in connection with the present invention in a comprehensive sense and designates any open or closed electronic realization of the node and pointer principle for structuring textual and/or multimedia information, data or services.

The World Wide Web (WWW) is an example of such hypertext data, but also a wiki, i.e. a collection of hyperlinked pages usually available within a network, which can be not only read by the particular users but also changed online Accordingly, a hypertext query designates a query for hypertext data, and a hypertext response a response providing hypertext data for a hypertext query. Hypertext services as a subset of the hypertext data represent programs and the like that can be called up via hyperlinks and can process hypertext data and handle hypertext queries, for example web services that can be called up over the Internet, preferably by other programs.

A hypertext server is preferably a software application that is adapted to receive hypertext queries and to send hypertext responses as a response to hypertext queries.

The terminal, e.g. a personal computer (PC) or a mobile terminal, is connected to the portable data carrier via a suitable communication interface. The latter can support a contact-type or contactlessly established communication link with the portable data carrier via a suitable communication protocol.

The method is carried out by means of an inventive data carrier. The latter comprises not only a memory for storing data and program code, a data communication interface for communication with a reading device and a processor, but also a hypertext server application stored in the memory, which is executable on the processor. The hypertext server application is adapted to receive a hypertext query from a terminal via the data communication interface, to provide hypertext data relating to the hypertext query, and to send the provided hypertext data to the terminal as a hypertext response via the data communication interface. The hypertext server application is furthermore adapted to check, upon the providing of the hypertext data, at least one hyperlink contained in the hypertext data.

The checked hyperlink can point to hypertext data retrievable by the terminal or to a hypertext service that can be called up by the terminal.

It is likewise possible to generate, starting out from the provided hypertext data relating to the hypertext query, a hypertext response based on the hypertext data, which is then sent to the terminal.

Upon the generation of the hypertext response, at least one portion of the hypertext data is integrated into the hypertext response in the form of at least one hyperlink pointing to said at least one portion of the hypertext data.

In this manner it is possible for the hypertext server to provide effectively for the terminal even large amounts of hypertext data in the form of hyperlinks pointing to said amounts of data and comprising for example multimedia data or the like. The data transmission of said amounts of hypertext data to the terminal need then not be handled via the data carrier, but can be effected by the terminal through resolution of the hyperlink provided by the hypertext server, via another communication link avoiding the portable data carrier. Any problems that occur with regard to memory capacity and data transfer rate upon transmission of large amounts of data via the portable data carrier can be effectively encountered in this manner.

At the same time, it is further possible for the hypertext server to provide hypertext data directly and in a secure manner to the terminal by the transmission of hypertext data taking place via the hypertext server on the portable data carrier to the terminal.

This alternative embodiment thus also serves to effectively provide data through a server on a portable data carrier for a terminal connected to the portable data carrier.

Upon the providing of the hypertext data through the hypertext server application, a portion of the hypertext data can be loaded onto the portable data carrier by the hypertext server application from one or more background servers. Background servers are server applications different from the hypertext server application and networked with the hypertext server application via a suitable communication protocol. The background servers are executed on devices different from the portable data carrier, so-called hosts, which are networked with the portable data carrier. Background servers can be for example web servers on the Internet.

A portion of the hypertext data can also be generated by the hypertext server application itself or be already stored on the portable data carrier.

A check of hyperlinks can comprise an availability check and an integrity check. In the availability check it is checked whether the hypertext data or hypertext services to which the hyperlink points are actually available on the corresponding background server. Different forms of the integrity check, which generally checks the trustworthiness of background servers to which the hyperlink points or from which hypertext data are loaded, will be shown hereinafter by way of example.

Preferably, the integrity of the background servers is checked by the hypertext server application before the hypertext response for the terminal is generated or the provided hypertext data are sent to the terminal as the hypertext response. This involves checking the correctness of the certificate used by the background server, with which the latter certifies e.g. a public key to be associated with the background server for an asymmetric encryption method. By means of said encryption method it is possible e.g. to set up a communication link with the background server, whereby the authenticity, integrity and confidentiality of the data transferred via said communication link is then guaranteed. For the integrity check there are for example root certificates stored on the portable data carrier, and the hypertext server application can validate a corresponding certificate chain from a root certificate to the certificate of a background server. Additionally, the hypertext server application can set up a communication link to an OCSP server (Online Certificate Status Protocol) and check the validity of a background server certificate directly.

Further, it is possible within the integrity check to check the correctness of the name resolution for a background server, i.e. the conversion of the background server name to the corresponding IP address of the background server. In the memory of the portable data carrier there can be stored for this purpose a plurality of pairs of server name and IP address for which the hypertext server application can then check whether the parameters determined for the background server (server name, IP address) match the data stored on the data carrier.

In particular, it is possible to check for integrity those background servers on which hypertext data are present that are integrated into the hypertext response in the form of hyperlinks pointing thereto. In addition to the above-described measures, it is possible to check the accessibility of a background server and the availability on this hypertext server of the corresponding hypertext data to which a hyperlink points, and in case of a negative result to optionally provide a hyperlink pointing to the same, available hypertext data on another, accessible background server.

Further, upon the checking of a hyperlink to a hypertext service it is possible to check the format of the hypertext service, for example of a "binding template", described by means of WSDL (Web Services Description Language), of a web service listed in a UDDI ("Universal Description, Discovery and Integration"). A binding template specifies e.g. formats of input and output, information about ports, protocols, executable operations and the like for a web service.

It is possible that the hypertext server first allows the terminal a privileged access to hypertext data, in particular security-critical hypertext data, via a hyperlink, the hyperlink being integrated into the hypertext response sent to the terminal. For example, the memory of the portable data carrier can store authentication information associated with the terminal and not present in the terminal itself. The hypertext server application can then set up a communication link with the background server in the name of the terminal by means of said authentication information, for example a PIN. The communication link established in this manner then makes the hypertext server application available to the terminal by means of the hyperlink integrated into the hypertext response, for example for a certain time period.

Preferably, the communication between the terminal and the hypertext server application is effected in encrypted form, i.e. the hypertext server application is adapted to set up a, for example SSL/TLS, encrypted communication link with the terminal, to decrypt encrypted data received from the terminal and to send encrypted data to the terminal.

In a preferred embodiment, the hypertext server application is implemented as a web server application which is adapted to receive hypertext queries from a terminal and send hypertext responses to the terminal by means of the HTTP communication protocol. A hypertext query preferably corresponds here to a query for a web resource addressable via a URL address, such as a web page or a web service. As a hypertext response for the terminal the hypertext server application generates a response page, e.g. in the form of a web page, structured by means of a marking language, preferably by means of HTML or WML.

The portable data carrier can be e.g. a (U)SIM mobile communication card, an Internet chip card or a USB token.

BRIEF DESCRIPTION OF THE DRAWINGS

Hereinafter the invention will be described by way of example with reference to the accompanying drawings. Therein are shown.

DETAILED DESCRIPTION OF VARIOUS EMBODIMENTS

Figure 1:
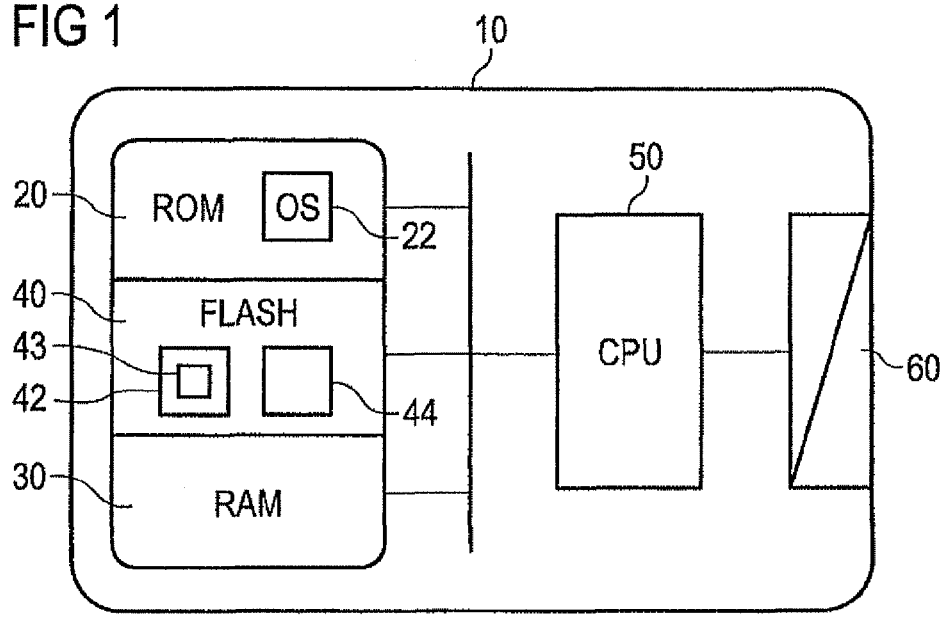
FIG. 1 a preferred embodiment of an inventive portable data carrier.

With reference to FIG. 1, a portable data carrier 10 configured as a chip card comprises a non-volatile, non-rewritable ROM memory 20 which stores the core of an operating system (OS) 22 controlling the data carrier 10. A volatile RAM memory 30 provides rapidly accessible working memory for a processor (CPU) 50. A non-volatile, rewritable FLASH memory 40 comprises storage areas 42 and 44. The storage area 42 can store software applications, e.g. the hypertext server application 43 described more precisely hereinafter. The storage area 44 is intended for storing data that are generated by applications executable on the processor 50 of the data carrier 10 or brought into the data carrier 10 via a data communication interface 60 for communication with a reading device. The memory 40 can alternatively also be configured as an EEPROM memory or the like. The access to the memories 20, 30 and 40 and to the data interface 60 is controlled by the operating system 22.

The hypertext server application 43 can be implemented for example as a web server application. The hypertext server application 43 is adapted here to receive hypertext queries from a terminal via the data communication interface 60 of the data carrier 10. Hypertext queries can be for example queries for a web resource, e.g. a web page or a web service, which is addressable via a URL address, that are made to the web server application 43 by a terminal, for example a PC or a mobile terminal, via the HTTP communication protocol. However, other hypertext queries from a set of hyperlinked hypertext data which are stored at one or more places in electronic, magnetic, optical or a similarly suitable form are also possible. The hypertext server application 43 is adapted to provide hypertext data relating to the received hypertext query. For this purpose, the hypertext server application 43 can read out hypertext data that are stored in the storage area 44 of the memory 40, generate hypertext data itself or load hypertext data from one or more background servers.

Background servers are any server applications different from the hypertext server application 43 which are executed on hosts different from the portable data carrier 10. Said hosts are networked with the portable data carrier 10, for example via the Internet, and a data transmission between the hypertext server application 43 and the background servers is possible, for example via the HTTP communication protocol. Other communication networks and protocols are likewise within the scope of the invention.

The hypertext server application 43 generates, based on the provided hypertext data, a hypertext response as a response to the hypertext query received from the terminal. For this purpose, the hypertext server application 43 is adapted to integrate into the hypertext response not only hypertext data generated by itself and/or read out from the storage area 44 and data loaded from background servers, which are in each case integrated directly into the generated hypertext response, but also hyperlinks. Said hyperlinks point to the hypertext data relating to the hypertext query. For example, text components of a web page requested by a terminal can be integrated directly into the hypertext response, while graphical elements or online advertising located on the same web page are made available to the terminal only via hyperlinks integrated into the generated hypertext response. For calling up/reading out the corresponding hypertext data, the hyperlink must then first be resolved on the terminal. The hypertext server application 43 is able here to expand the corresponding pointers specified as local hyperlinks on the web page into absolute hyperlinks while specifying the corresponding background server address.

A hypertext response generated in this manner can be for example an HTML or WML page which contains data loaded from a first background server which are structured by means of control commands read out from the memory 40 or generated by the hypertext server application 43. Furthermore, said hypertext response comprises hyperlinks pointing to hypertext data located on the first, or one or more other background servers.

The hypertext server can also obtain a hypertext response, however, by relaying data for example loaded from a background server and corresponding directly to the hypertext query, for example a simple web page without graphical elements, to the terminal unchanged after the hyperlinks contained in the hypertext data relayed as the hypertext response have been checked as hereinafter described. Separate steps of generating the hypertext response and integrating hyperlinks into said hypertext response are then no longer necessary.

The hypertext server application 43 is adapted to send the hypertext response to the terminal via the data communication interface 60. The terminal can be connected to the portable data carrier in different ways here. For example, the terminal can be a PC which accesses a portable data carrier 10 configured as a chip card via a card reading device, or the terminal is a mobile terminal which accesses a portable data carrier 10 configured as a (U)SIM mobile communication card by means of a J2ME MIDlet.

The storage area 44 of the memory 40 of the portable data carrier 10 can contain authentication information relating to a terminal, for example a PIN or an electronic password. By means of said authentication information the hypertext server application 43 can establish a communication link with a background server in the name of the terminal and provide the terminal in this manner with a privileged access to the corresponding hypertext data. It is possible that the corresponding authentication information is not present in the terminal, so that the hypertext server application 43 is essential for completion of the communication link between the terminal and the background server. For example, the hypertext server application 43 can serve as an authentication proxy upon establishment of a communication link to an online bank. As authentication information, e.g. a PIN or a password of a user of the terminal is stored securely on the portable data carrier 10.

The communication link between the terminal and the background server can then be established directly via the portable data carrier 10 and the hypertext server application 43 or be provided by the hypertext server application 43 to the terminal as a hyperlink integrated into the hypertext response. The terminal can then use said communication link provided via the hyperlink and obtain the hypertext data to which the hyperlink points from the corresponding background server independently of the hypertext server application 43 and the portable data carrier 10.

The hypertext server application 43 is adapted to check hyperlinks and background servers to which said hyperlinks point, for availability and integrity. In particular, it is provided that the integrity of those background servers is checked on which hypertext data are located to which hyperlinks point that are integrated into the hypertext response by the hypertext server application 43. Within a check such hyperlinks are checked for availability to ensure that the hypertext data that are pointed to are actually present and available. If such a check turns out negative, i.e. the corresponding hypertext data are not available at the place specified by the hyperlink, or the corresponding background server storing the hypertext data is not accessible, the hypertext server application 43 can optionally generate a new hyperlink pointing to available identical hypertext data on an accessible background server.

An integrity check generally comprises a check of the trustworthiness of the certificates of the background servers. For this purpose, the storage area 44 of the memory 40 of the portable data carrier 10 can store a number of root certificates. The hypertext server application 43 is adapted to validate a certificate chain from a root certificate down to a background server certificate. Additionally the hypertext server application can effect a validity query of the certificate of a background server via OCSP (Online Certificate Status Protocol) in order to optionally recognize a temporarily occurring invalidity of such a certificate.

It is further possible that the hypertext server application 43 checks the name resolution of the server name of a background server to a corresponding IP address within an integrity check. This is possible for example by the storage area 44 storing a plurality of server names with corresponding IP addresses which are known to the hypertext server application as background servers and are accepted as such. If a pair of server name and IP address determined within the integrity check cannot be identified in the plurality of known and accepted pairs available in the storage area 44, the corresponding background server can be rejected as non-accepted. For requested web services, the availability of specific function calls can additionally be checked, for example via UDDI.

Only those hypertext data for which the described checks of those background servers on which the corresponding hypertext data are present have turned out positive within the integrity check are integrated into the hypertext response directly or by means of hyperlinks pointing thereto or are relayed as a hypertext response.

The hypertext server application 43 is adapted to exchange data with the terminal via a secure communication link. The communication link can be encrypted via the SSL/TLS protocol for transferring hypertext data, for example HTML pages. It is also possible that the hypertext server application 43 establishes via SOAP (originally for "Simple Object Access Protocol") a link secured with XML encryption and XML signatures to a web service/RPC ("Remote Procedure Call") client executed on the terminal.

Figure 2:
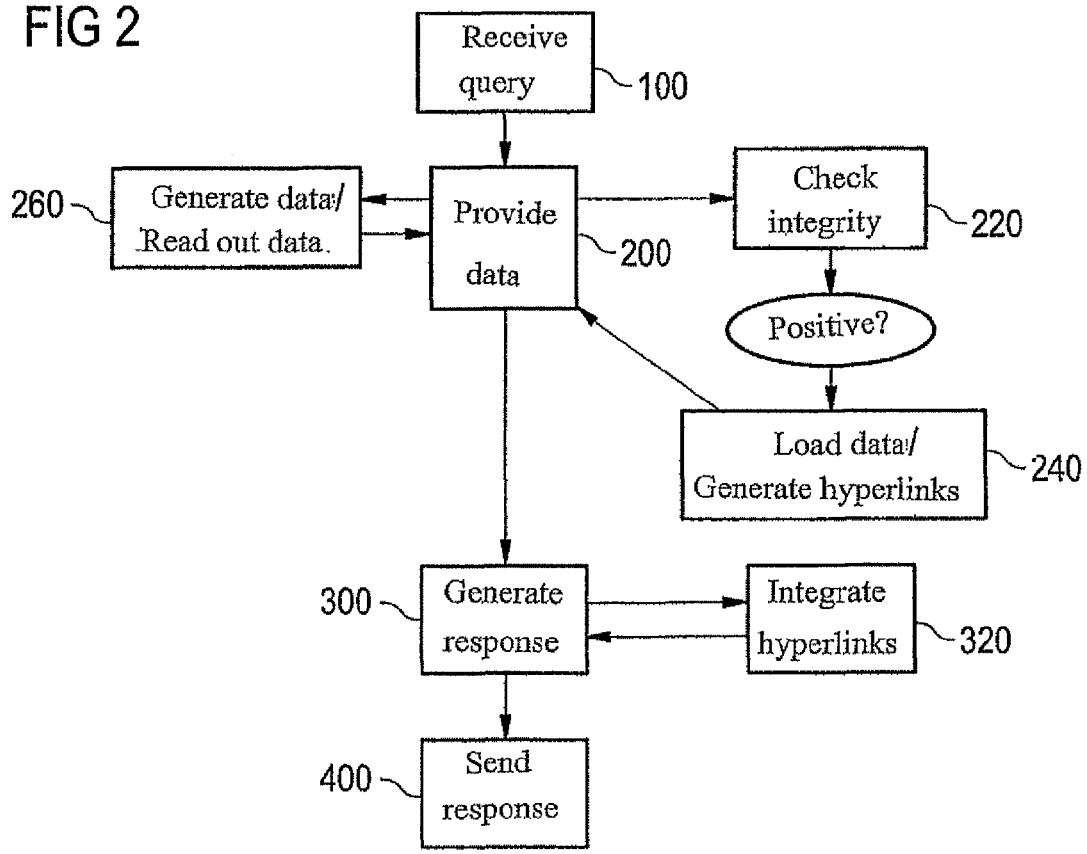
FIG. 2 the steps of a preferred embodiment of the inventive method.

With reference to FIG. 2, the steps of a preferred embodiment of the inventive method will be described. The hypertext server application 43 here is a web server application 43 on the portable data carrier 10, and the terminal a PC or mobile terminal which is connected to the portable data carrier as described hereinabove. The portable data carrier 10 can be configured as an Internet chip card, (U)SIM mobile communication card, USB token or the like.

In step 100 the web server application 43 on the portable data carrier 10 receives a hypertext query from the terminal via a communication link secured as described hereinabove ("Receive query"). The hypertext query can be a query for a web page made by a web browser executed on the terminal, or also a web service requested, or a RPC call executed, by a web server/RPC client executed on the terminal.

In step 200 the web server application 43 provides hypertext data relating to the hypertext query ("Provide data").

It is possible that a portion of the hypertext data requested by the hypertext query is stored in the storage area 44 of the memory 40 of the portable data carrier 10, such as hypertext data repeatedly requested by the terminal, or can be generated by the web server application itself, for example control commands of a marking language such as HTML or WML for structured, hereinafter described generation of the hypertext response. This kind of hypertext data is provided in step 260 ("Generate data/Read out data").

Hypertext data that cannot be generated by the web server application 43 itself and that are not present on the portable data carrier 10 are provided by the web server application via background servers. For this purpose, in step 220 the integrity of a corresponding background server is first checked as described hereinabove ("Check integrity"). If all checks turn out positive ("Positive?"), the web server application 43 loads in step 240 as described hereinabove the data corresponding directly to a hypertext query, which can be relayed to the terminal unchanged, or generates hyperlinks to at least one portion of the hypertext data and optionally loads the remaining hypertext data relating to the hypertext query from the background server ("Load data/Generate hyperlinks"). It is of course possible that hyperlinks on hypertext data lying ready on a plurality of different background servers are generated and hypertext data are loaded from different background servers.

On the basis of the hypertext data provided in step 200 by means of the steps 220, 240 and 260, the web server application 43 generates in step 300 a hypertext response for the terminal ("Generate response").

For this purpose, the generated hyperlinks are integrated in step 320 into a hypertext response page which is preferably set up by means of a marking language, such as HTML or WML ("Integrate hyperlinks"). The hyperlinks point to hypertext data relating to the hypertext query, for example (parts of) HTML pages, or web services/RPC servers. Hypertext data generated by the web server application and/or read out from the storage area 44 of the memory 40 of the data carrier 10 can likewise be components of the hypertext response.

In the case of a hypertext response that consists of hypertext data that have either been generated by the portable data carrier itself and/or loaded from a background server, and can be relayed to the terminal unchanged, the step 320 can be omitted.

In step 400 the web server application sends the hypertext response generated in step 300 to the terminal via the secure communication link ("Send response"). The hypertext data in the hypertext response can then be accessed by the terminal directly provided that the corresponding hypertext data are integrated into the hypertext response as such, or else via the hyperlinks integrated into the hypertext response, then via a communication link not running via the web server application 43 and not via the portable data carrier 10.

Figure 3:
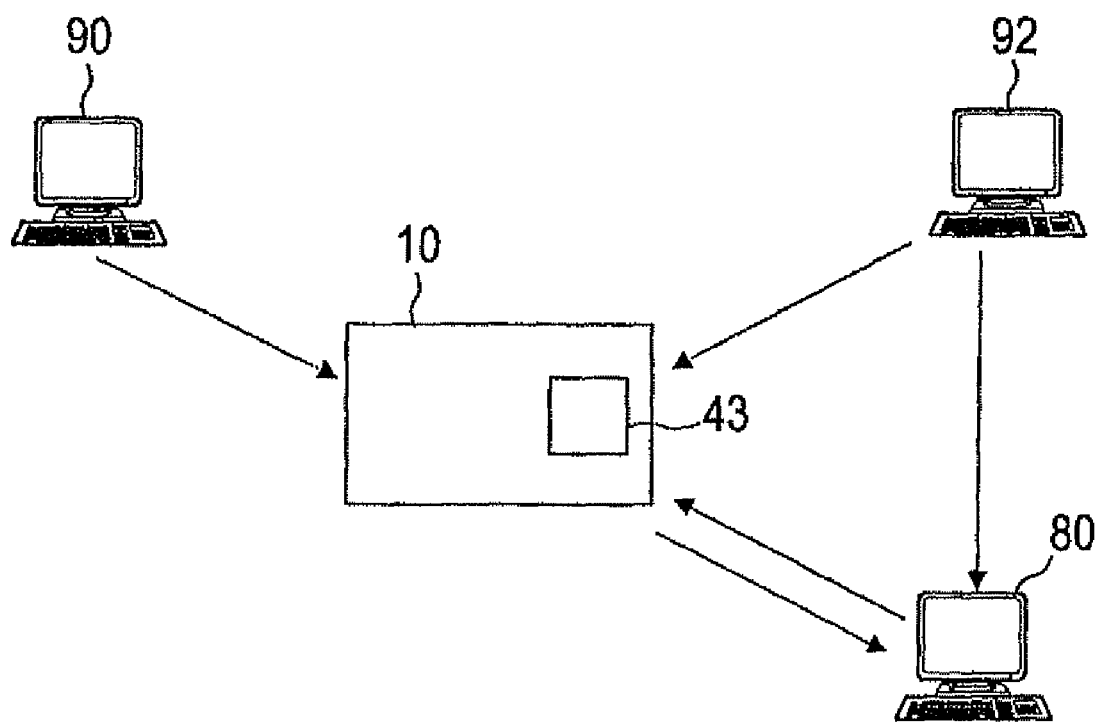
FIG. 3 a schematic view of the components involved in a preferred embodiment of the inventive method, and their interaction.

FIG. 3 shows schematically the components involved in the method. The hypertext server application 43 on the portable data carrier 10 receives a hypertext query from a terminal 80 of a user, for example starting out from a web browser application executed on the terminal 80, and relating to a web page present on a background server 90. The hypertext server application 43 can load the web page onto the portable data carrier 10 from the background server 90. The web page can comprise a hyperlink to a further web resource, for example to a further web page present on a further background server 92. The hypertext server application 43 on the portable data carrier 10 checks said hyperlink, as described hereinabove, and if the check has turned out positive, sends the web page with the checked hyperlink to the terminal 80 which can then also access the further web page on the further background server 92 directly and securely by means of the checked hyperlink.

The invention claimed is:

1. A method for providing hypertext data through a hypertext server on a portable data carrier for a terminal locally connected to the portable data carrier, comprising the following steps in the portable data carrier:
  receiving a hypertext query of the terminal by the hypertext server on the locally connected portable data carrier;
  providing hypertext data relating to the hypertext query through the hypertext server; and
  sending the provided hypertext data as a hypertext response to the terminal;
  wherein, upon the providing of the hypertext data, at least one hyperlink contained in the hypertext data is checked and the checked hyperlink is contained in the hypertext response, wherein the hyperlink points to a hypertext service on a background server that can be called up by the terminal.

2. The method according to claim 1, wherein, upon the providing of the hypertext data, at least one portion of the hypertext data is represented in the form of at least one hyperlink pointing to the at least one portion of the hypertext data.

3. The method according to claim 2, wherein the hypertext server provides the terminal with a privileged access to hypertext services to which the checked hyperlink in the hypertext response points.

4. The method according to claim 1, wherein, upon the checking of the hyperlink, the availability of the hypertext service to which the hyperlink points, is checked.

5. The method according to claim 1, wherein, upon the checking of the hyperlink, a certificate of a background server is checked on which the hypertext data are present to which the hyperlink points, or a certificate of a background server is checked on which the hypertext service is present to which the hyperlink points.

6. The method according to claim 1, wherein, upon the checking of the hyperlink, a name resolution of a background server is checked on which the hypertext data are present to which the hyperlink points, or a name resolution of a background server is checked on which the hypertext service is present to which the hyperlink points.

7. The method according to claim 1, wherein, upon the checking of the hyperlink, the format of a hypertext service is checked to which the hyperlink points.

8. The method according to claim 1, wherein the provided hypertext data represent result data of a call of a hypertext service through the hypertext server corresponding to the hypertext query.

9. The method according to claim 1, wherein, upon the providing of the hypertext data, at least one portion of the hypertext data is loaded from at least a first background server onto the hypertext server.

10. The method according to claim 1, wherein the checked hyperlink points to a second background server.

11. The method according to claim 1, wherein the integrity of a background server is checked whose hypertext data are integrated into the hypertext response in the form of hyperlinks.

12. The method according to claim 1, wherein the hypertext server receives the hypertext query in encrypted form and decrypts it and sends the hypertext response to the terminal in encrypted form.

13. The method according to claim 1, wherein the hypertext server is a web server and receives the hypertext query and sends the hypertext response by means of the HTTP communication protocol, and the hypertext query of the terminal is a URL address which points to a web resource.

14. The method according to claim 13, wherein the hypertext server generates the hypertext response as a web page structured by means of a marking language.

15. A portable data carrier, comprising a memory, a processor, a data communication interface for communication with a reading device, and a hypertext server application which is executable on the processor and is configured to
  receive via the data communication interface a hypertext query from a terminal locally connected to the data carrier;
  provide hypertext data relating to the hypertext query;
  send the provided hypertext data as a hypertext response via the data communication interface to the terminal;
  wherein the hypertext server application is further configured to check, upon the providing of the hypertext data, at least one hyperlink contained in the hypertext response, wherein the hyperlink points to a hypertext service on a background server that can be called up by the terminal.

16. The portable data carrier according to claim 15, configured to execute the method according to claim 2.

17. The portable data carrier according to claim 15, wherein the hypertext server application is configured to set up an encrypted communication link with a terminal, to decrypt encrypted data received via said communication link and to send encrypted data to the terminal via said communication link.

18. The portable data carrier according to claim 15, wherein the hypertext server application is implemented as a web server application which is configured to receive by means of the HTTP communication protocol a hypertext query of a terminal which relates to a web resource addressable via a URL address, in particular a web page or a web service, and to send a hypertext response to said hypertext query.

19. The portable data carrier according to claim 18, wherein the web server application is configured to generate the hypertext response as a web page structured by means of a marking language, in particular by means of HTML or WML.

20. The portable data carrier according to claim 15, wherein the data carrier is configured as a (U)SIM mobile communication card or as an Internet chip card or as a USB token.

* * * * *